United States Patent [19]

Yamazaki et al.

[11] Patent Number: 4,934,926
[45] Date of Patent: Jun. 19, 1990

[54] METHOD AND APPARATUS FOR MONITORING AND CONTROLLING BURNER OPERATING AIR EQUIVALENCE RATIO

[75] Inventors: Masakazu Yamazaki, Tokyo; Masaaki Oya; Kentaro Tsuchiya, both of Ibaraki, all of Japan

[73] Assignee: Agency of Industrial Science & Technology, Ministry of International Trade & Industry, Tokyo, Japan

[21] Appl. No.: 319,758

[22] Filed: Mar. 7, 1989

[30] Foreign Application Priority Data

Mar. 25, 1988 [JP] Japan ................................. 63-72438

[51] Int. Cl.$^5$ ........................... F23N 1/00; F23N 5/08
[52] U.S. Cl. ........................................ 431/75; 431/12; 431/79
[58] Field of Search ............................. 431/79, 12, 75

[56] References Cited

U.S. PATENT DOCUMENTS 4,653,998  3/1987  Sohma et al. ........................ 431/79

Primary Examiner—Carl D. Price
Attorney, Agent, or Firm—Oblon, Spivak, McClelland, Maier & Neustadt

[57] ABSTRACT

Burner operating air equivalence ratio is monitored and controlled by a method comprising measuring OH radical spectral emission intensity at a base of a flame while combustion is in progress at a burner, employing a linear relationship between the intensity and an actual burner operating air equivalence ratio to determine the ratio while combustion is in progress, comparing the determined ratio with a desired burner operating air equivalence ratio to determine the difference therebetween, and controlling the amount of air supplied to the burner on the basis of the difference.

1 Claim, 3 Drawing Sheets

METHOD AND APPARATUS FOR MONITORING AND CONTROLLING BURNER OPERATING AIR EQUIVALENCE RATIO

BACKGROUND OF THE INVENTION

1. Field of the Invention

This invention relates to a method for monitoring and controlling the burner operating air equivalence ratio in an industrial combustion apparatus and to a monitoring and control apparatus for implementing this method.

2. Prior Art Statement

In an industrial combustion apparatus, fuel and air are supplied to and burned in one or more burners so as to utilize the resulting thermal energy. When the ratio of the amount of supplied air to the amount of air theoretically required for complete combustion (this ratio being called the "burner operating air equivalence ratio" hereinafter) is less than unity, fuel fails to burn completely and unburnt fuel remains. As it is therefore impossible to realize complete conversion of the fuel's chemical energy into thermal energy, energy loss results. On the other hand, when the burner operating air equivalence ratio is greater than unity, the amount of combustion gas increases in proportion to the air equivalence ratio, which results in an increase in heat lost by being carried away by the flue gas and a corresponding decline in thermal efficiency. Thus for achieving maximum thermal efficiency, it is necessary to burn fuel under the smallest air equivalence ratio possible within the range which does not lead to incomplete combustion. This optimum air equivalence ratio is determined by fuel-air mixing characteristics in the burner flame and thus depends on the burner structure, the kind of fuel, heat release rate and the like. Therefore, the optimum air equivalence ratio is not a universal value among a wide variety of combustion apparatus. This makes it necessary to monitor the air equivalence ratio at each of the burners with high accuracy so that the burner can be controlled and maintained at the desired air equivalence ratio.

The method for monitoring and controlling air equivalence ratio which has been generally used is as follows. The overall air equivalence ratio in the combustion apparatus is computed from the combustion gas composition which is analyzed through flue gas sampling, and the computed air equivalence ratio is fed back to the operation for controlling the air equivalence ratio (the air flow rate adjustment operation).

However, this conventional monitoring and control method is disadvantageous in that, for example, (1) the burner operating air equivalence ratio cannot be accurately detected because the flue gas composition does not represent the actual burner operating air equivalence ratio when atmospheric air leaks into the apparatus, and (2) most industrial combustion apparatus are equipped with more than one burner so that even though the overall air equivalence ratio may be appropriate for the apparatus as a whole, this does not necessarily mean that each individual the burner is operated under optimum air equivalence ratio.

For overcoming these problems, there have been proposed two kinds of methods for monitoring and controlling the operating air equivalence ratio of the individual burners based on detecting the light emission from the flame. These are summarized here.

(1) The burner operating air equivalence ratio is controlled so as to maintain the intensity of some specific emission spectrum from the flame at its maximum value. This method is based on the general combustion characteristics that when the air equivalence ratio is in the vicinity of unity, fuel and air react most vigorously, causing the maximum intensity of the flame emission spectra.

(2) The ratio between the intensities of two specific emission spectra with different wavelength from the flame varies in a specific manner with change in the air equivalence ratio. Based on this characteristic, control is conducted by maintaining the ratio between two specific emission spectra at that corresponding to the target air equivalence ratio.

The first of these methods has the defect that the air equivalence ratio can be controlled only to a fixed value in the vicinity of unity and thus cannot be arbitrarily adjusted to the optimum value particular to the combustion apparatus in use. The second method has the disadvantage that the flame emission spectra in the visible and/or infrared regions employed as indices can be affected by the radiation from hot portions in the apparatus such as the burner tile and the furnace wall. This gives rise to problems regarding accuracy and stability. Moreover, since the variation of the spectral intensity ratio with air equivalence ratio is not an algebraic function, it is necessary to use a complex process for setting the target air equivalence ratio as well as a complex system for control.

Because of these defects in the earlier proposed methods and apparatuses, there has not yet been established technology enabling the light emission from the burner flame to be used for monitoring and controlling the burner operating air equivalence ratio.

OBJECT AND SUMMARY OF THE INVENTION

One object of the present invention is to provide a method for monitoring and controlling the burner operating air equivalence ratio in a combustion apparatus wherein the burner operating air equivalence ratio is accurately detected and controlled to a desired value utilizing light emission from the burner flame.

Another object of the present invention is to provide an apparatus for carrying out the aforesaid method.

For achieving these objects the present invention detects the burner operating air equivalence ratio by the OH radical emission from the flame based on the linear relationship between OH radical emission spectrum intensity and air equivalence ratio, and controls the combustion air flow rate to an appropriate value so as to maintain the desired air equivalence ratio.

The intensity of the OH emission spectrum at the base of the burner flame varies with the air equivalence ratio in the manner of a linear function and when the fuel flow rate is changed, the OH emission spectrum intensity varies in proportion to the fuel flow rate. Therefore, by detecting the intensity of the OH emission spectrum from the base of the flame it becomes possible to control the air equivalence ratio to the desired value, easily and with high accuracy at any heat release rate.

The above and other objects and features of the invention will become more apparent from the following detailed description with reference to the accompanying drawings.

DETAILED DESCRIPTION OF THE PREFERRED EMBODIMENT

Through his research toward solving the aforesaid problems in the optical detection and control of burner operating air equivalence ratio by utilizing the light emission from the flame, the inventor discovered the following facts:

(1) At the base of the burner flame immediately downstream from the burner outlet, the OH emission spectrum intensity varies with the air equivalence ratio in the manner of a linear function.

(2) While the constants in this linear function differ with the kind of fuel, with certain kinds of fuel the OH emission spectrum intensity changes in proportion to fuel flow rate so that the constants in the linear function are merely multiplied by normalized fuel flow rate (fuel flow rate in operation divided by the reference value).

This knowledge enabled the inventor to control the air equivalence ratio to the desired value based on the detected intensity of the OH emission spectrum from the base of the flame and thus made it possible for him to accomplish the present invention.

Figure 1:
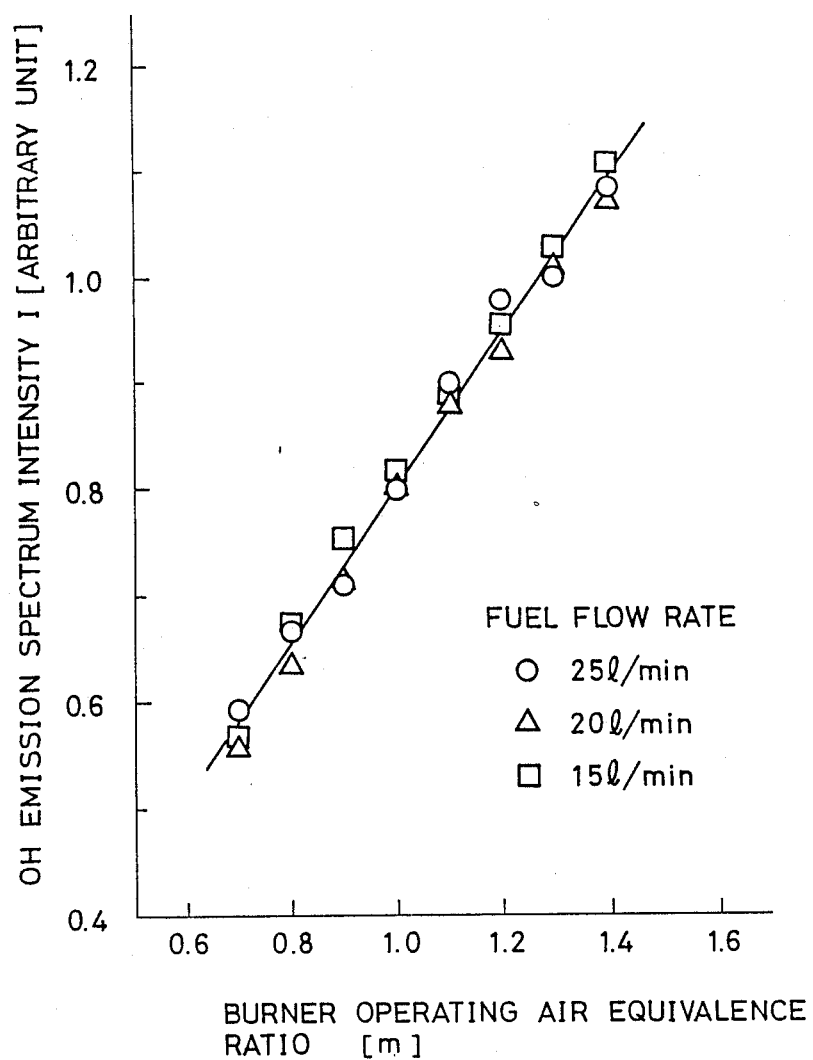
FIG. 1 represents experimental results of obtained for the relationship between the burner operating air equivalence ratio and the OH emission spectrum intensity when propane is burned.
Figure 2:
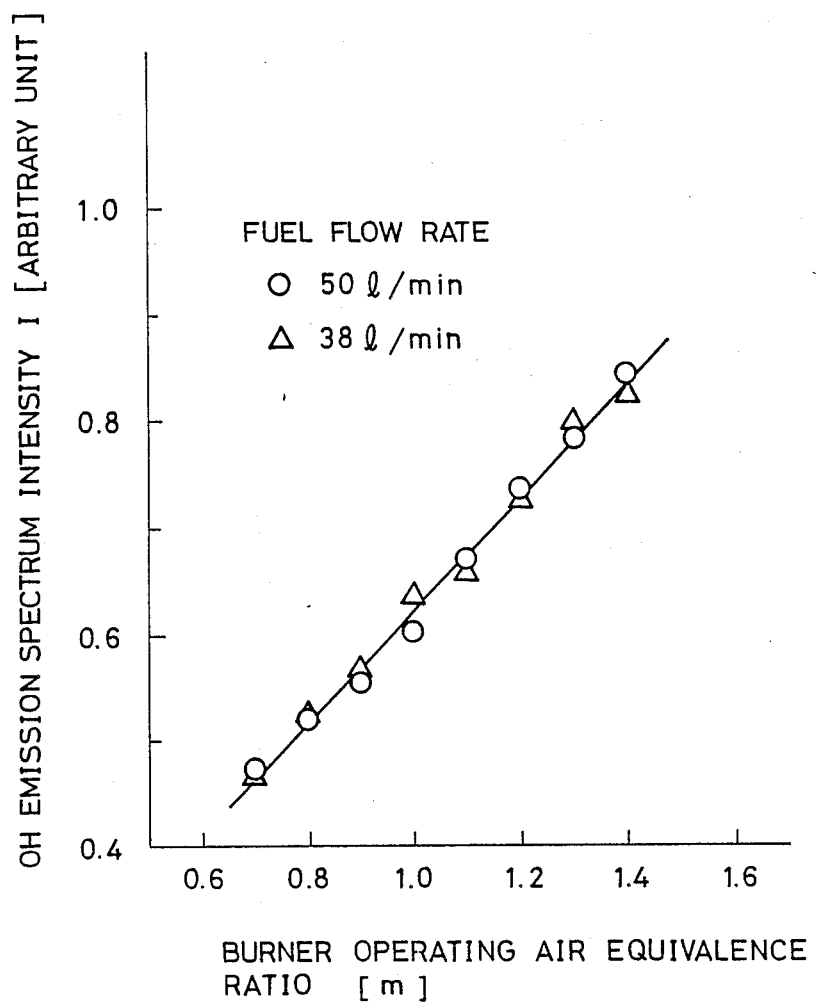
FIG. 2 represents similar results when methane is burned.

The principle underlying this invention will now be explained in detail with reference to FIGS. 1 and 2. FIG. 1 represents the experimental results obtained when a commercially available gas burner (model 50 PS, manufactured by Takamitsu Industrial Co. of Japan) was operated using propane as fuel and the intensity of the OH emission spectrum (in terms of the voltage value after photoelectric conversion) from the base of the flame was measured at various fuel flow rates and burner operating air equivalence ratios. The overall length of the flame was about 1 m and the emission spectrum was measured at a location 50 mm in the axial direction of the flame from the burner outlet. While the OH emission has a number of band spectra at different wavelengths, FIG. 1 shows the spectral intensity at the wavelength of 309 nm. In this graph, the burner operating air equivalence ratio is represented on the x-axis and the OH spectral intensity normalized by the fuel flow rate is represented on the y-axis. More specifically, the reference fuel flow rate was set to 20 1/min and when the actual flow was, for instance, 15 1/min, the spectral intensity was plotted after multiplication by 20/15. It will be noted that, within a small range of measurement scatter, all of the measured results fall on a straight line that can be expressed as a linear function. FIG. 2 is a graph showing similar measurement results in the case where the fuel was methane.

From FIGS. 1 and 2 it will be understood that the OH emission spectrum intensity I can be expressed in terms of the burner operating air equivalence ratio m as $$I = f(am + b) \quad (1)$$

where a and b are constants determined by the type of the burner and the kind of fuel and f is the ratio of the fuel flow rate during actual operation to the reference fuel flow rate. What this means is that once the relationship between the air equivalence ratio and the OH spectral intensity has been calibrated for the reference fuel flow rate in order to fix the constants a and b in Equation (1), it is possible to determine the burner operating air equivalence ratio m by Equation (1) with the ratio f from the measured value of the fuel flow rate and the measured value I of the OH spectral intensity from the base of the flame. Therefore, if a spectral intensity value corresponding to a desired target air equivalence ratio is set and an air flow rate control valve is controlled so as to keep the OH emission spectrum intensity coincident with this set value, the optimum combustion state at the target air equivalence ratio can be maintained. It should be noted that while the constants a and b in Equation (1) differ with the kind of fuel burned, this does not give rise to a serious problem in practical operation since the kind of fuel is not changed so often in an industrial combustion apparatus and thus the aforesaid calibration will be needed very seldom.

Figure 3:
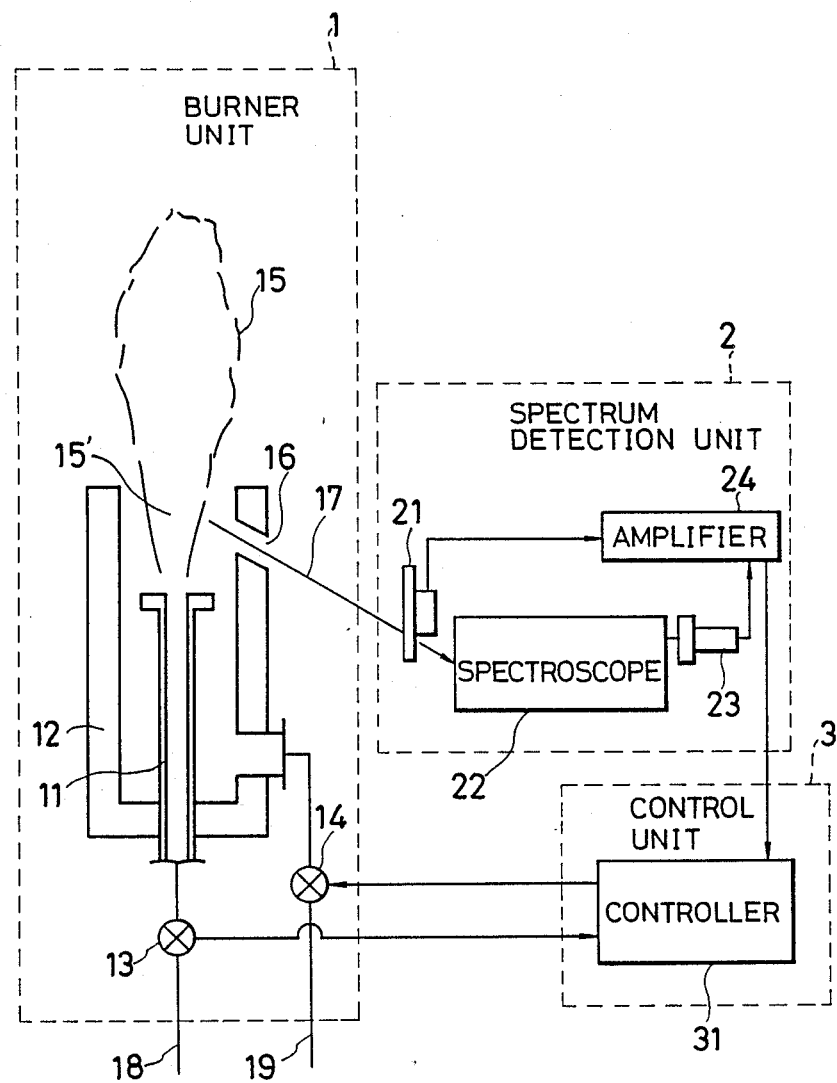
FIG. 3 is a schematic illustration of one embodiment of a monitoring and control apparatus according to the present invention.

An embodiment of an apparatus for carrying out the aforesaid method for monitoring and controlling combustion will now be explained with reference to FIG. 3. The apparatus for monitoring and controlling burner operating air equivalence ratio shown in FIG. 3 consists of a burner unit 1, a spectrum detection unit 2 and a control unit 3.

The burner unit 1 includes a burner 11 and a surrounding burner tile 12. The burner 11 is connected with a pipe 18 for supplying fuel thereto through a fuel flowmeter 13 and with a pipe 19 for supplying air thereto through an air flow control valve 14. The burner tile 12 is provided with a flame observation aperture 16 located to enable observation of the base 15' of the flame 15.

The spectrum detection unit 2 has a spectroscope 22 located at a position enabling observation of the base of the flame 15' through the flame observation aperture 16 of the burner tile 12, a chopper 21 positioned in front of the spectroscope 22, a photomultiplier 23 for converting the spectral intensity signal from the spectroscope 22 into an electrical signal, and a lock-in amplifier 24 for amplifying and removing noise from the converted signal.

The control unit 3 is constituted as a controller 31 having computation capability. The controller 31 receives a fuel flow rate signal indicating the amount of fuel flowing through the pipe 18 and an electric signal from the lock-in amplifier 24 and transmits a signal for adjusting the degree of opening of the air flow control valve 14 provided in the pipe 19. These devices can be of the conventional type.

In the so-arranged apparatus, fuel and air are supplied through the pipes 18 and 19 so as to form the flame 15 at the burner 11. The light emission 17 from the base 15' of the flame 15 passes through the flame observation aperture 16 and the chopper 21 and enters the spectroscope 22. The OH emission spectrum detected from this light by the spectroscope 22 is photoelectrically converted by the photomultiplier 23. The resulting electric signal corresponding to the OH emission spectrum signal together with an open/close signal from the chopper 21 is forwarded to the lock-in amplifier 24 where the signal is amplified and removed of noise and then sent to the control unit 3. (It should be noted that it is possible to replace the spectroscope 22 and photomultiplier 23 of the spectrum detection unit 2 with a photoelectric conversion element such as a photocell having high sensitivity to the OH emission spectrum in the ultraviolet region.) The values of the constants a and b in Equation (1) are stored in advance in the controller 31 and the ratio f is given by the output signal from the fuel flowmeter 13. Thus, the intensity of the OH emission spectrum corresponding to the desired target air equivalence ratio can be determined from Equation (1). Therefore, by controlling the degree of opening of the air flow control valve 14 so as to cause the signal representing the intensity of the OH emission spectrum to coincide with the target value, it becomes possible to constantly maintain the optimum operating air equivalence ratio irrespective of any variation in the fuel flow rate.

As is clear from the aforesaid explanation, in the present invention the control is carried out based on the detected ultraviolet emission spectrum from the OH radical, an intermediate combustion product, and as this spectrum is of a short wavelength, it is not affected by the radiation of visible and infrared wavelength radiation from hot portions in the apparatus such as the burner tile and the furnace wall. The control is thus highly reliable. Another superior feature of the method and apparatus according to the present invention is that since the OH emission spectrum is detected at the base of the flame near the burner outlet, the spectrum detection unit and the controller can easily be installed in the burner unit, and still another is that since the transfer function at the controller is a simple linear function, it becomes possible to realize excellent response characteristics and stability using a simply constituted circuit arrangement. As a result, monitoring and controlling the air equivalence ratio can be reliably achieved based on the light emission from the flame employing a principle that differs fundamentally from those employed in the prior art methods.

What is claimed is:

1. A system for monitoring and controlling burner operating air equivalence ratio in a burner into which fuel and air are separately supplied for combustion, comprising:

means for measuring OH radical spectral emission intensity I at a base of a flame while combustion is in progress at the burner;

means for calculating an actual burner operating air equivalence ratio m while combustion is in progress from the measured OH radical spectral emission intensity I on the basis of equation $I = f \cdot (a \cdot m + b)$, wherein a and b are constants determined by the kind of fuel used, f is the ratio of the fuel flow rate during actual combustion relative to reference fuel flow rate, and I is the measured OH radical spectral emission intensity measured by said measuring means; and means for comparing the calculated actual burner operating air equivalence ratio m with an optimum burner operating air equivalence ratio based on said equation to obtain the difference therebetween and controlling the amount of air supplied to the burner on the basis of said difference.

* * * * *